US005262221A

United States Patent [19]

Terada et al.

[11] Patent Number: 5,262,221

[45] Date of Patent: Nov. 16, 1993

[54] HEAT-SENSITIVE STENCIL PAPER

[75] Inventors: Yukihiro Terada, Fuji; Toshihiro Asai, Shizuoka; Masaki Murasawa, Suita, all of Japan

[73] Assignee: Kohjin Co., Ltd., Tokyo, Japan

[21] Appl. No.: 773,955

[22] PCT Filed: Apr. 27, 1990

[86] PCT No.: PCT/JP90/00567

§ 371 Date: Dec. 6, 1991

§ 102(e) Date: Dec. 6, 1991

[87] PCT Pub. No.: WO91/13766

PCT Pub. Date: Sep. 19, 1991

[30] Foreign Application Priority Data

Mar. 14, 1991 [JP] Japan .................................. 2-60928

[51] Int. Cl.[5] ............................................ B32B 3/00

[52] U.S. Cl. .................................... 428/195; 428/211; 428/304.4; 428/311.3; 428/311.7; 428/336; 428/342; 428/913

[58] Field of Search ............... 428/137, 211, 262, 264, 428/290, 335, 336, 341, 342, 359, 360, 361, 413, 423.1, 537.5, 913, 195, 304.4, 311.3, 311.7

[56] References Cited

U.S. PATENT DOCUMENTS 4,957,808 9/1990 Arai et al. .......................... 428/262

FOREIGN PATENT DOCUMENTS 62-92892 4/1977 Japan .
59-33196 2/1984 Japan .
61-40196 2/1986 Japan .

*Primary Examiner*—Patrick J. Ryan
*Assistant Examiner*—Elizabeth Evans
*Attorney, Agent, or Firm*—Oliff & Berridge

[57] ABSTRACT

A thermosensitive stencil paper contains a main component layer formed of a thermoplastic film and an ink-permeable support bonded together with adhesive, in which the ink-permeable support is a porous thin paper containing polynosic fibers as the main fibrous component. Optionally, the thermosensitive stencil paper has a plastic film layer whose surface is coated with a mold release layer containing as a main component a silicone oil having a kinematic viscosity of 500,000 cs or more. The transfer operation of the stencil paper in an automatic printer is excellent and its ink feeding performance during printing is high because of the polynosic fiber-containing porous thin paper support. Nonprinted spot defects are reduced because of the small number of bundled fibers in the stencil paper. Stencil paper containing the mold release layer are free of offsetting when rolled and cause no sticking for a long period of time, thereby providing thermosensitive stencil paper with excellent performance.

6 Claims, No Drawings

HEAT-SENSITIVE STENCIL PAPER

FIELD OF THE INVENTION

The present invention relates to a heat-sensitive stencil paper which is suited for thermal heads, and to a porous tissue paper to be used therefor. More particularly, it relates to a heat-sensitive stencil paper which is suited for the preparation of a stencil using a high-speed and high-resolution stencilizer printer, an apparatus consisting of an integrated combination of a stencilizer and a printer.

PRIOR ART

In recent years, there has been developed the technology of stencilizing a stencil paper by using a heat element, such as a thermal head, and the technology has been in practical use. In addition, there have appeared on the market stencilizer printers, which are consisted of an integrated combination of a stencilizer and a printer designed to achieve a higher printing speed and a higher resolution.

In general, a heat-sensitive stencil paper to be used for stencilizer printers is composed of an ink permeating support on which is adhered a thermoplastic film.

As supports to be used for heat-sensitive stencil papers, there have been proposed various porous tissue papers, including those prepared from natural fibers of, e.g., kozo (paper mulberry), mitsumata (*Edgeworthia papyrifara*), Manila hemp or the like; those prepared from synthetic fibers, for example, rayon, vinylon or polyester fibers; and those prepared from a mixture of natural and synthetic fibers. However, in products actually available on the market at present are used tissue papers prepared from fibers of Manila hemp, polyester or a mixture of hemp and polyester. With the expansion of the use of automatic stencilizers or automatic stencilizer printers in recent years, heat-sensitive stencil papers consisting mainly of Manila hemp have come to be used most widely due to their excellent transportability.

Among known stencilization processes are included so-called xenon flash lamp perforation method and so-called thermal head perforation method. In the former method, a stencil paper and an original is superposed in such a manner that the marginal portions in the peripherals of the stencil paper are fixed, and then infrared rays are irradiated thereon, whereby the heat sensitive film present on the porous tissue paper of the stencil paper shrinks to form perforations in accordance with the image of the original. In the latter method, a thermal head is allowed to contact with the surface of the heat-sensitive film of the stencil paper and activated to generate heat at places to be image-wise perforated, whereby the positions of the film contacted with the thermal head instantaneously shrink, forming perforations.

The thermal head perforation method is now becoming more popular than the xenon flash lamp perforation method since it is less susceptible to undesirable generation of perforations in background areas.

However, heat-sensitive stencil papers using a porous tissue paper prepared from natural fibers consisting mainly of Manila hemp suffer from shives characteristic of natural fibers. Knot areas present in a heat-sensitive could be hardly perforated. Even in cases where knot areas could be somehow perforated, perforations formed in the areas do not permeate sufficient quantities of ink upon stencil printing, thus forming unprinted white spots on printed products. Because of this, various proposals have been made to obtain knot-free porous tissue papers from natural fibers. However, the quality of natural fibers, such as Manila hemp, varies widely depending on the site of cultivation, weather, and the like. The production of such tissue papers requires a complicated production control and hence suffers from the problem of low productivity. It is very difficult, so long as natural fibers are used, to completely solve the problem of knots, like the cases where synthetic polyester fibers are employed.

On the other hand, heat-sensitive stencil papers using a porous tissue paper prepared from polyester fibers can be almost free from the problem of knots, but suffer from the problems that their rigidity is insufficient for stencilization using an automatic stencilizer and that their transportability is poor due to generation of static electricity charge. Furthermore, heat-sensitive stencil papers using a polyester tissue paper tend to suffer from the problem that printed letters of high density areas are supplied with ink only insufficiently, compared with the cases where natural fibers are used. Because of this, there is resulted an undesirable emergence of fiber marks upon printing, shady letters, unevenly inked solid areas, and unprinted white spots in the central parts of solid areas after duplication of a large number of copies.

As a compromise, it has been proposed to mix polyester fibers with a small quantity of natural fibers. This technique however is still unable to completely solve the above problems resulting from the use of a porous tissue paper consisted of polyester fibers, and when the proportion of natural fibers is increased, knots of natural fibers are formed. Accordingly, it is not possible to solve the problems concerning transportability and white spots at the same time.

In the case of heat-sensitive stencil papers with a structure where a thermoplastic film is layered on an ink permeable support, there occurs so-called sticking phenomenon, whereby the thermoplastic film is thermally adhered onto the thermal head. As a result of the phenomenon, perforated holes become widened, the film is damaged or peeled off around the areas of perforated holes and, in extreme cases, the scanning of heat-sensitive stencil papers on the head may be completely hampered.

In order to prevent the sticking phenomenon, it has been proposed to form a releasing layer on the surface of the thermoplastic film. Among releasing layers proposed so far are included a silicone layer curable at room temperature [Japanese Patent Application (Laid Open) No. 153,697/83], a UV-curable silicone layer [Japanese Patent Application (Laid Open) No. 295,098/86] and functional group-containing silicone oil layers [Japanese Patent Application (Laid Open) Nos. 31,696/89; 237,196/89 and 238,992/89].

Such releasing layers, however, may cause various problems to highly sensitive heat-sensitive stencil papers to be used for high speed high resolution stencilizer printers.

For example, in the case of a releasing layer consisting of silicone oil, the antisticking effect can be sufficiently high even when silicone oil is used in a small quantity and no particular problems arise under ordinary use conditions. However, when stencil papers are preserved over an extended period of time in a state closely contacted each other, silicone oil, which in general is a liquid at ordinary temperature, tends to migrate into the ink permeable support, thus causing an undesirable lowering in antisticking effect This tendency becomes greater in the case of heat-sensitive stencil papers to be used in integrated stencilizer printers since such stencil papers are supplied to users in the form of rolls, in which the releasing layer is strongly contacted with the ink permeable support, and this strong contact is maintained for an extended period of time. Because of this, an excess of silicone oil must be applied if the antisticking effect is to be maintained over a long period of time, and this excessive use of silicone oil causes problems upon stencilization if the stencil papers are used within a relatively short period of time after production.

In cases where the releasing layer is consisted of a curable silicone, there is resulted a stencil paper that exhibits only poor slippage property for the scanning of heat-sensitive stencil papers on the head, and when the stencilization is continuously performed at a high energy level, the resultant stencil often suffers from shrinkage. In addition, there is required a relatively thick releasing layer when a sufficient antisticking effect is desired. However, such a thick releasing layer impedes perforation and deteriorates the sharpness of printed images.

A heat-sensitive stencil paper is therefore desired that is protected from sticking without perforation impediment with application of minimum quantity of releasing agent.

DISCLOSURE OF THE INVENTION

The present invention relates to a heat-sensitive stencil paper which is free from unprinted white spots resulting from shives in porous tissue paper, excellent in transportability in automatic stencilizers, excellent in resolution of letters and in uniformity of solid areas, and free from unprinted white parts in the central areas of solid areas, and to a porous tissue paper to be used therefor. It also relates to a heat-sensitive stencil paper which exhibits a stable stencilizability and antisticking effect for a long period of time.

Thus, the present invention is concerned with a heat-sensitive stencil paper comprising as a major constituting layer a thermoplastic film adhered on an ink permeating support with an adhesive, said ink permeating support being a porous tissue paper consisting mainly of polynosic fibers. It is also concerned with a heat-sensitive stencil paper comprising a thermoplastic film layer having provided thereon a releasing layer consisting mainly of silicone oil having a kinematic viscosity of 500,000 cs or above.

Polynosic fiber is a kind of cellulose fiber having a high tensile strength and a high initial Young's modulus which can be obtained by spinning, in a low-temperature, low-acid-density spinning bath, a low alkaline viscose having a low ripening degree and a high polymerization degree of, e.g., 450 or above.

Polynosic fibers to be used as a major component in the porous tissue paper according to the invention have a length of ca. 2 to 15 mm, more preferably ca. 3 to 5 mm, and a diameter of ca. 10 denier or less, more preferably 0.5 to 2.0 denier. Polynosic fibers of a length of ca. 3 to 5 mm can be preferable with regard to dispersibility. The use of fibers that do not fall within the above limits will be disadvantageous with regard to resolution of letters or the like. It can be preferred to use polynosic fibers subjected to an antistatic treatment within the limit that the objectives of the present invention are not impeded. Porous tissue paper prepared from such fibers will be less susceptible to troubles which may be caused by static electricity charge.

Into the porous tissue paper to be used in the invention are blended polynosic fibers up to a Gurley's stiffness (JIS L-1079-5-17E) in the direction of transportation of ca. 2.0 mg or above, preferably 3.0 mg or above. If the rigidity of the porous tissue paper is insufficient, troubles will arise during its transportation.

Within the scope which does not impair the purpose of the present invention, the polynosic fibers can be used in combination with other fibers that satisfies above-described conditions on length and diameter, including synthetic fibers, such as polyester fibers, high-strength rayon fibers, high-strength vinylon fibers and polyphenylene sulfite (PPS) fibers, and natural fibers, such as Manila hemp fibers, etc., which have hitherto been used in porous tissue papers for heat-sensitive stencil papers. In such a case, fibers other than polynosic are generally used at a ratio of up to ca. 30% by weight. The limit however varies depending on the kind of fibers used. If synthetic fibers other than polynosic are used in excessive quantities, there will be resulted an undesirable lowering in transportability and in the supply of ink, whereas if the natural fibers are used excessively, the resulting tissue paper will suffer from shives.

The porous tissue paper consisting mainly of polynosic fibers according to the invention has a basis weight of preferably ca. 7.0 to 16.0 $g/m^2$, more preferably ca. 9.0 to 14.0 $g/m^2$, and a thickness of preferably ca. 30 to 80 um. Porous tissue papers that do not fall within the above limits are not preferred as a support for heat-sensitive stencil papers with regard to strength and supply of ink.

The porous tissue papers consisting mainly of polynosic fibers can be prepared by admixing raw fibers (i.e., polynosic fibers and, if any, others) and an appropriate binder component, and then by subjecting the mixture to conventional wet method paper-making. It is preferable to use PVA fibers as a binder component since PVA fibrous binders cause little impediment .to printing properties and exhibit good adhering property. It can be most preferred to use PVA fibers that satisfy the above-described conditions on length and diameter defined for polynosic fibers. In order to attain good printing properties, the binder component is usually incorporated up to a ratio of ca. 30% by weight, more preferably at a ratio of ca. 10 to 20% by weight.

It is also possible to incorporate other conventional additives for paper making, such as dry and wet-strength resin, dispersants, etc. within limits no adverse effects are exerted on printing properties.

As examples of thermoplastic films which can be layered with the porous tissue paper, mention may be made of films of polyethylene terephthalates, polyfluorovinylidenes, polyvinylidene chlorides, or the like. However, usable thermoplastic films are not limited to these. The thickness of the film is preferably ca. 1.5 to 5 $\mu m$. If it is less than 1.5 $\mu m$, the handling of resulting stencil papers will become difficult, whereas if the thickness exceeds 5 um, excessive energy will be required for perforation. In either case, there will be attained no practical perforability. It can be preferable to use a film which is shrinkable at low temperature. Highly sensitive stencil papers can be obtained by using such a film. This is because, when the thermal head is contacted with such a film, it can be efficiently perforated because of its shrinkage.

Heat-sensitive stencil papers according to the present invention can be prepared by laminating the above-described thermoplastic film with the above-described porous tissue via an adhesive and then optionally providing an antisticking layer on the surface of said film.

There is no particular limitation on the kind of adhesive to be used for the lamination, and any thermoplastic adhesives which can adhere the film and the porous tissue paper can be employed. As examples of usable adhesives, mention may be made of polyvinyl acetate, polyacrylic, polyester and nylon adhesives.

As examples of components which can be used in the antisticking layer (i.e., releasing layer), mention may be made of surface active agents, slipping agents, silicones, and other materials which are capable of exhibiting releasing capability. Of these materials, silicone oils having a kinematic viscosity (measured according to JIS K-2283) of 500,000 cs or above can be particularly preferred. When a silicone oil having a kinematic viscosity smaller than 500,000 cs is applied to a heat-sensitive stencil paper which is stored in the form of a roll, the silicone oil will migrate into the ink permeable support with the lapse of time, thus bringing about deterioration in antisticking effect over the lapse of time. Because of this, the quantity of silicone oil contained in the releasing layer must be increased to an unnecessarily high level, at which a sufficient perforability could hardly be attained.

Explanation will be given hereinbelow on the case where silicone oil having a kinematic viscosity of 500,000 cs or above is used.

As stated hereinabove, the releasing layer according to the invention is consisted mainly of silicone oil which has preferably a kinematic viscosity of 500,000 cs or above. The quantity of above mentioned silicone oil in the releasing layer is preferably 50% by weight or above, more preferably 70% by weight or above. When the quantity is less than 50% by weight, the antisticking effect characteristic of the silicone oil will not be fully attained after prolonged storage.

in addition to silicone oil having a kinematic viscosity of 500,000 cs or above, the releasing layer may be incorporated with other components which will cause no serious impairment in the antisticking effect of the silicone oil, in an amount not exceeding 50% by weight. Examples of components which can be incorporated into the layer include those which have been conventionally used in prior releasing layers, such as silicone compounds, coating aids for the thermoplastic film, surface active agents, inorganic pigments, and the like for preventing the thermal head from staining.

It is also possible to incorporate antistatic agents into the releasing layer in order to prevent transportation troubles resulting from static electricity charge which may be generated depending on the structure of stencilizer printers used.

The releasing layer may be formed on the surface of the film by any of the known methods, incuding the bar coating, roll coating and air knife coating methods. The silicone oil may be applied in the form of a solution in an appropriate solvent or in the form of an aqueous dispersion prepared by using as an emulsifier an anionic surfactant, such as salts of carboxylic acids, salts of alkylaryl sulfonic acids, etc., or a nonioic surfactant, such as alkyl ethers.

With regard to the order of production steps, the releasing layer may at first be formed on a thermoplastic film, and the film may then be adhered with an ink permeable support. Alternatively, an ink permeable support may at first be adhered to a thermoplastic film, and the releasing layer may then be formed on the surface of the film.

The releasing layer exhibits its effect quite effectively when applied at a coverage of 0.005 $g/m^2$ to 0.3 $g/m^2$. When it is less than 0.005 $g/m^2$, sticking tends to occur, whereas when it is greater than 0.3 $g/m^2$, undesirable deterioration in perforability tends to be resulted.

BEST MODE TO PRACTICE THE INVENTION

The present invention will hereinafter be explained in detail by examples. It should however be noted that the invention is by no means limited to these.

In the examples, test results were evaluated as follows:

1) Shives

Shives included in a porous tissue paper were observed with naked eyes and rated as follows:

◎: Excellent
○: Fairly good
×: Poor

2) Transportability

By using an automatic stencilizer printer (Risograph 007 DPE manufactured by Riso Kagaku Kogyo K.K.), 100 sheets of heat-sensitive stencil papers were stencilized and subjected to printing under conditions of 20° C., 60% R.H., and it was observed whether or not they could be transported or forwarded smoothly. The results were rated as follows:

○: No transportation troubles occurred.
Δ: Transportation troubles occurred 1 to 5 times.
×: Transportation troubles occurred more than 5 times.

3) Deformation in Solid Areas after Stencilization

A heat-sensitive stencil paper was stencilized by an automatic stencilizer of digital perforation type (Gakken ODX-2020 manufactured by Gakushu Kenkyusha K.K.), whereby Test Chart No. 2 of the Society of Electrophotography was used as a manuscript. The deformation formed in solid areas was observed by naked eyes and rated as follows:

○: No deformation
Δ: Slightly deformed
×: Considerably deformed

4) Printing Property

Using an automatic stencilizer printer (Risograph 007 DPE manufactured by Riso Kagaku Kogyo K.K.) and Test Chart No. 2 of the Society of Electrophotography, heat-sensitive stencil papers were stencilized and printed at a printing rate of 100 copies/min. The resolution of letters and the uniformity of solid areas on the 100th copy were evaluated according to the criteria set forth below, and the unprinted white spots generated in the middle parts of solid areas on the 500th copy were evaluated according to the criteria as set forth below:

Resolution:

The connection and thickening of dots in letters were observed by naked eyes and rated as follows.

◎: Excellent
○: Good
Δ: Dots are unconnected partly or tend to be thickened
×: Dots are poorly connected or hardly legible due to thickening Uniformity in High Density Areas:

Observed by naked eyes and rated as follows.

○: Good

Δ: Slightly inferior
×: Poor

Unprinted White Spots:

Observed by naked eyes and rated as follows.
○: Good
Δ: A small number of spots observed
×: A large number of spots observed

EXAMPLE 1

A mixture of 80 parts by weight of polynosic fibers (produced by Toyobo Co., Ltd.) having a length of 5 mm and a diameter of 1.0 denier and 20 parts by weight of fibrous PVA binder (VPB 107-1,3 mm produced by Kuraray Co., Ltd.) was subjected to wet method paper making system by a Fourdrinier paper machine to give a porous tissue paper having a basis weight and a thickness as shown in Table 1.

Shives present in the porous tissue paper were observed and Gurley's stiffness (JIS L-1079-5-17E) in the machine direction of the paper was determined. Results obtained are also shown in Table 1.

Onto a biaxially stretched polyester film (produced by Dia Foil Co., Ltd.) having a thickness of 2 μm was coated by a roll coater a polyvinyl acetate emulsion adhesive (Rika Bond PS-2000 produced by Chuo Rika Kogyo K.K.) at a coverage (after drying) of 0.7 g/m$^2$. Immediately after the coating, the film was adhered to the porous tissue paper to produce a layered product having a structure of film/adhesive/ink permeable support. A heat-sensitive stencil paper according to the invention was prepared by coating on the film surface of the layered product a releasing layer-forming solution prepared by dissolving 5 parts by weight of silicone oil (SH-200, 1,000,000 cs, produced by Toray Dow-Corning Silicone Co.) into 95 parts by weight of toluene at a coverage (after drying) of 0.1 g/m$^2$. Thus obtained heat-sensitive stencil paper was stencilized by an automatic high-speed digital stencilizer printer (Risograph 007D manufactured by Riso Kagaku Kogyo K.K.) and subjected to printing by using the same apparatus, and the antisticking property and the quality of printed images were evaluated. The migration of the releasing layer was tested by storing the heat-sensitive stencil paper in the state of a roll for a period of 6 months at 20° C., 65% R.H., followed by evaluation of sticking and the quality of printed images. There were obtained sharp printed images both from the stored stencil paper and from the fresh stencil paper, without suffering from transportation and sticking problems. Results obtained are shown in Table 1.

EXAMPLE 2

A mixture of 64 parts by weight of polynosic fibers (produced by Toyobo Co., Ltd.) having a length of 5 mm and a diameter of 1.0 denier, 16 parts by weight of Manila hemp fibers having a length of 4 mm and an average diameter of 14 μm and 20 parts by weight of fibrous PVA binder (VPB 107-1,3 mm produced by Kuraray Co., Ltd.) to wet method paper making system by a Fourdrinier paper machine to give a porous tissue paper having a basis weight and a thickness as shown in Table 1.

Shives present in the porous tissue paper were observed and Gurley's stiffness in the machine direction of the paper was determined. Results obtained are shown in Table 1.

The porous tissue paper was layered with a biaxially stretched polyester film having a thickness of 2 μm in the same manner as in Example 1. Then, a releasing layer was formed thereon in the same manner as in Example 1, using a solution of 3.5 parts by weight of silicone oil (SH-200, 1,000,000 cs, produced by Toray Dow-Corning Silicone Co.), 1.5 parts by weight of epoxy-modified silicone oil (SF-8413, 18,000 cs, produced by Toray Dow-Corning Silicone Co.) and 95 parts by weight of toluene. The thus obtained heat-sensitive stencil paper was stencilized and subjected to printing in the same manner as in Example 1. The paper, both before and after storage, exhibited good transportability, was free from sticking, and produced sharp printed images.

The paper was evaluated in the same manner as in Example 1. Results obtained are also shown in Table 1.

EXAMPLE 3

A mixture of 63 parts by weight of polynosic fibers (produced by Toyobo Co., Ltd.) having a length of 5 mm and a diameter of 1.5 denier, 27 parts by weight of high strength rayon having a length of 5 mm and a diameter of 1.5 denier and 10 parts by weight of fibrous PVA binder (VPB 107-1,3 mm produced by Kuraray Co., Ltd.) was subjected to wet paper making by a cylinder paper machine to give a porous tissue paper having a basis weight and a thickness as shown in Table 1.

Shives present in the porous tissue paper were observed and Gurley's stiffness in the machine direction of the paper was determined. Results obtained are shown in Table 1.

The porous tissue paper was layered with a biaxially stretched polyester film having a thickness of 2 μm in the same manner as in Example 1. Then, a releasing layer was formed thereon in the same manner as in Example 1, using a dispersion of 16.7 parts by weight of silicone oil emulsion (SM-8705; 3,000,000 cs; solid content, 30%; produced by Toray Dow-Corning Silicone Co.) and 83.3 parts by weight of water. Thus obtained heat-sensitive stencil paper was stencilized and subjected to printing in the same manner as in Example 1. The paper, both before and after storage, exhibited good transportability, was free from sticking, and produced sharp printed images.

The paper was evaluated in the same manner as in Example 1. Results obtained are also shown in Table 1.

EXAMPLE 4

A heat-sensitive stencil paper was prepared in the same manner as in Example 1, except that a dispersion of 16.7 parts by weight of silicone oil emulsion (SM-8701; 1,000,000 cs; solid content, 30%; produced by Toray Dow-Corning Silicone Co.) and 83.3 parts by weight of water was used instead of the releasing layer-forming solution. Thus obtained heat-sensitive stencil paper was stencilized and subjected to printing in the same manner as in Example 1. The paper, both before and after storage, exhibited good transportability, was free from sticking, and produced sharp printed images.

EXAMPLE 5

A heat-sensitive stencil paper was prepared in the same manner as in Example 1, except that a dispersion of 5 parts by weight of silicone oil emulsion (SM-8705; 3,000,000 cs; solid content, 30%; produced by Toray Dow-Corning Silicone Co.), 11.7 parts by weight of silicone oil emulsion (SM-8701; 1,000,000 cs; solid content, 30%; produced by Toray Dow-Corning Silicone Co.) and 83.3 parts by weight of water was used instead of the releasing layer-forming solution. Thus obtained heat-sensitive stencil paper was stencilized and subjected to printing in the same manner as in Example 1. The paper, both before and after storage, exhibited good transportability, was free from sticking, and produced sharp printed images.

EXAMPLE 6

A heat-sensitive stencil paper was prepared in exactly the same manner as in Example 1, except that a solution of 5 parts by weight of silicone oil emulsion (SH-200, 100,000 cs, produced by Toray Dow-Corning Silicone Co.) and 95 parts by weight of toluene was used instead of the releasing layer-forming solution. Thus obtained heat-sensitive stencil paper was stencilized and subjected to printing in the same manner as in Example 1. The paper not subjected to the storage test, exhibited good transportability and was free from troubles with regard to sticking and quality of printed images.

EXAMPLE 7

A heat-sensitive stencil paper was prepared in the same manner as in Example 1, except that a dispersion of 16.7 parts by weight of silicone oil emulsion (BY12-803; 20,000 cs; solid Content, 30%; produced by Toray Dow-Corning Silicone Co.) and 83.3 parts by weight of water was used instead of the releasing layer-forming solution. Thus obtained heat-sensitive stencil paper (not subjected to the storage test) was stencilized and subjected to printing in the same manner as in Example 1. The paper was free from troubles with regard to sticking and quality of printed images.

COMPARATIVE EXAMPLE 1

A mixture of 90 parts by weight of Manila hemp having a fiber length of 4 mm and a fiber diameter of 14 μm and 10 parts by weight of fibrous PVA binder (VPB 107-1,3 mm produced by Kuraray Co., Ltd.) was subjected to wet paper making by a cylinder paper machine to give a porous tissue paper having a basis weight and a thickness as shown in Table 1.

Shives present in the porous tissue paper were observed and Gurley's stiffness in the machine direction of the paper was determined. Results obtained are shown in Table 1.

A heat-sensitive stencil paper was prepared therefrom and evaluated in the same manner as in Example 1. Results obtained are also shown in Table 1.

COMPARATIVE EXAMPLE 2

A mixture of 80 parts by weight of polyester fibers having a length of 5 mm and a diameter of 1.0 denier and 20 parts by weight of fibrous PVA binder (Udy EP 101, produced by Kuraray Co., Ltd.) was subjected to wet paper making by a cylinder paper machine to give a porous tissue paper having a basis weight and a thickness as shown in Table 1.

Shives present in the porous tissue paper were observed and Gurley's stiffness in the machine direction of the paper was determined. Results obtained are shown in Table 1.

A heat-sensitive stencil paper was prepared therefrom and evaluated in the same manner as in Example 1. Results obtained are also shown in Table 1.

COMPARATIVE EXAMPLE 3

A mixture of 80 parts by weight of rayon fibers having a length of 5 mm and a diameter of 1.0 denier and 20 parts by weight of fibrous PVA binder (VPB 107-1; fiber length, 3 mm; produced by Kuraray Co., Ltd.) was subjected to wet paper making by a cylinder paper machine to give a porous tissue paper having a basis weight of 12 g/m$^2$.

Shives present in the porous tissue paper were observed and Gurley's stiffness in the machine direction of the paper was determined. Results obtained are shown in Table 1.

A heat-sensitive stencil paper was prepared therefrom and evaluated in the same manner as in Example 1. Results obtained are also shown in Table 1.

COMPARATIVE EXAMPLE 4

A heat-sensitive stencil paper was prepared in the same manner as in Example 1, except that a solution of 12.5 parts by weight of silicone oil (SH-200, 100,000 cs, produced by Toray Dow-Corning Silicone Co.) and 87.5 parts by weight of toluene was used instead of the releasing layer-forming solution and that the coverage of the releasing layer was increased to 0.5 g/m$^2$. The thus obtained heat-sensitive stencil paper (not subjected to the storage test) was stencilized and subjected to printing in the same manner as in Example 1. The paper was free from sticking, but there were resulted printed images having only insufficient density and inferior sharpness because of insufficient perforability.

INDUSTRIAL AVAILABILITY

The heat-sensitive stencil paper according to the present invention is excellent in transportability in automatic stencilizers since its support is made of a porous tissue paper containing polynosic fibers as a major fiber component. Since polynosic fibers are homogeneous and produces less shives compared with Manila hemp fibers, the stencil paper can be superior in resolution of letters and suffers less from unprinted white spots resulting from shives. In addition, the support is superior in ink supplying property to those consisting mainly of polyester fibers, there can be obtained a heat-sensitive stencil paper which is excellent resolution of letters and in uniformity in solid areas and suffers less from unprinted white spot in the central parts of solid areas, unlike those made of polyester fibers.

The present invention also provides a heat-sensitive stencil paper provided on the surface of the film support with a releasing layer consisting mainly of silicone oil having a kinematic viscosity of 500,000 cs or above (measured by JIS K-2283). This type of stencil paper can be free from the influence of migration in the state of a roll and hence does not suffer from sticking over an extended period of time.

TABLE 1

| | Basis Weight (g/m$^2$) | Thickness (μm) | Gurley's Stiffness in Machine Direction (mg) | Shives | Transportability | Deformation in Solid Areas | Resolution | Uniformity in solid Areas | Unprinted White Spots in Solid Areas |
|---|---|---|---|---|---|---|---|---|---|
| Example 1 | 11.0 | 50 | 3.6 | ◎ | ○ | ○ | ◎ | ○ | ○ |
| Example 2 | 12.0 | 52 | 2.5 | ○ | ○ | ○ | ○ | ○ | ○ |

TABLE 1-continued

| | Basis Weight (g/m²) | Thickness (μm) | Gurley's Stiffness in Machine Direction (mg) | Shives | Transport-ability | Deformation in Solid Areas | Resolution | Uniformity in solid Areas | Unprinted White Spots in Solid Areas |
|---|---|---|---|---|---|---|---|---|---|
| Example 3 | 11.5 | 48 | 3.2 | ○ | ○ | ○ | ○ | ○ | ○ |
| Comparative Example 1 | 10.8 | 40 | 3.0 | x | ○ | ○ | Δ | Δ | ○ |
| Comparative Example 2 | 13.0 | 48 | 1.5 | ⊚ | x | x | x | x | Δ |
| Comparative Example 3 | 12.0 | 51 | 0.7 | ○ | x | ○ | ○ | ○ | ○ |

What is claimed is:

1. A heat-sensitive stencil paper comprising as a major constituting layer a thermoplastic film adhered onto an ink permeating support with an adhesive, said ink permeating support being a porous tissue paper comprising at least 63% by weight of polynosic fibers which have a length of about 2 to 15 mm, a diameter of about 10 denier or less, a Gurley's stiffness of 2.0 mg or more, a basis weight of about 7.0 to 16.0 g/m$^2$, and a thickness of about 30 to 80 microns.

2. A heat-sensitive stencil paper as claimed in claim 1, wherein the polynosic fibers have a length of 3 to 5 mm, a diameter of about 0.5 to 2.0 denier, a Gurley's stiffness of 3.0 mg or more, and a basis weight of about 9.0 to 14.0 g/m$^2$.

3. A heat-sensitive stencil paper as claimed in claim 1, wherein the thermoplastic film has provided thereon a release layer comprising silicone oil having a kinetic viscosity of 500,000 cs or above.

4. A heat-sensitive stencil paper comprising as a major constituting layer a thermoplastic film adhered onto an ink permeating support with an adhesive, said ink permeating support being a porous tissue paper containing at least 63% by weight of polynosic fibers which have a Gurley's stiffness of 2.0 mg or more, wherein the thermoplastic film has provided thereon a release layer comprising silicone oil having a kinetic viscosity of 500,000 cs or above.

5. A porous tissue paper for heat-sensitive stencil papers, comprising at least 63% by weight of polynosic fibers which have a length of about 2 to 15 mm, a diameter of 10 denier or less, a Gurley's stiffness of 2.0 mg or more, a basis weight of about 7.0 to 16.0 g/m$^2$, and a thickness of about 30 to 80 microns.

6. A porous tissue paper as claimed in claim 5, wherein the polynosic fibers have a length of about 3 to 5 mm, a diameter of 0.5 denier to 2 denier, a Gurley's stiffness of 3.0 mg or more, and a basis weight of about 9.0 to 14.0 g/m$^2$.

* * * * *